US012670609B2

(12) United States Patent
Singh et al.

(10) Patent No.: US 12,670,609 B2
(45) Date of Patent: Jun. 30, 2026

(54) SYSTEM AND METHOD FOR ESTIMATING SIZE OF A FINGER OF A USER

(71) Applicant: ULTRAHUMAN HEALTHCARE PVT LTD, Bangalore South (IN)

(72) Inventors: Pawanpreet Singh, Patiala (IN); Jaskaran Singh, Patiala (IN); Mohit Kumar, Bangalore (IN); Vatsal Singhal, Bangaluru (IN); Bhuvan Srinivasan, Bangalore (IN); Adhit Shet, Bangalore (IN)

(73) Assignee: ULTRAHUMAN HEALTHCARE PVT LTD, Bangalore South (IN)

( * ) Notice: Subject to any disclaimer, the term of this patent is extended or adjusted under 35 U.S.C. 154(b) by 0 days.

(21) Appl. No.: 19/045,810

(22) Filed: Feb. 5, 2025

(65) Prior Publication Data

US 2025/0182312 A1     Jun. 5, 2025

Related U.S. Application Data

(63) Continuation of application No. 18/626,315, filed on Apr. 3, 2024, now abandoned.

(30) Foreign Application Priority Data

Nov. 20, 2023     (IN) .............................. 202341078716

(51) Int. Cl.
*G06T 7/62*                (2017.01)

(52) U.S. Cl.
CPC ............ *G06T 7/62* (2017.01); *G06T 2200/24* (2013.01); *G06T 2207/10016* (2013.01); *G06T 2207/20081* (2013.01); *G06T 2207/30196* (2013.01)

(58) Field of Classification Search
CPC ................... G06T 7/62; G06T 2200/24; G06T 2207/10016; G06T 2207/20081; G06T 2207/30196
See application file for complete search history.

(56) References Cited

U.S. PATENT DOCUMENTS 9,411,780 B1 *   8/2016   Awad ........................ G06T 7/62
10,002,377 B1 *   6/2018   Johnson ............. G06Q 30/0631
(Continued)

FOREIGN PATENT DOCUMENTS

CN          106355598 A  *  1/2017  ............... G06T 7/60
EP            3422278 A1     1/2019
WO         2022118536 A1     6/2022

OTHER PUBLICATIONS

Frati et al. "Using Kinect for hand tracking and rendering in wearable haptics." 2011 IEEE World Haptics Conference. IEEE, 2011. (Year: 2011).*

(Continued)

*Primary Examiner* — Katrina R Fujita
(74) *Attorney, Agent, or Firm* — Renner, Otto, Boisselle & Sklar, LLP

(57)          ABSTRACT

A system and a method for estimating size of a finger of a user. The method comprises acquiring one or more images of a hand of the user and a pre-defined reference object by an image capturing device, and recognizing the pre-defined reference object and the hand of the user, for removal of background of the one or more images. By connecting outermost points on contour of the hand, a bounding region is created by the processor. Points of convexity defects are determined on the hand for identifying each finger of the hand. A second bounding box is assigned to a finger of the hand. A size of the finger of the user is estimated based on dimension of a width of the second bounding box deter- (Continued)

mined from on actual dimensions of the pre-defined reference object.

15 Claims, 4 Drawing Sheets

(56) References Cited

U.S. PATENT DOCUMENTS

| | | | | |
|---|---|---|---|---|
| 10,789,725 | B2 * | 9/2020 | Segman | G06T 7/149 |
| 11,386,569 | B2 * | 7/2022 | Shea | G06T 7/60 |
| 2014/0310271 | A1 * | 10/2014 | Song | G06F 3/017 |
| | | | | 707/758 |
| 2014/0321718 | A1 * | 10/2014 | Wabgaonkar | G06F 18/251 |
| | | | | 382/115 |
| 2015/0242683 | A1 * | 8/2015 | Tang | G06V 40/113 |
| | | | | 382/173 |
| 2018/0247426 | A1 * | 8/2018 | Gluck | G06Q 30/0643 |
| 2019/0005672 | A1 * | 1/2019 | McLear | G06V 40/11 |
| 2019/0026001 | A1 * | 1/2019 | Hebbalaguppe | G06T 7/70 |
| 2019/0392205 | A1 * | 12/2019 | Tang | G05D 1/2285 |
| 2020/0013182 | A1 * | 1/2020 | Sompura | G06T 7/62 |
| 2020/0027232 | A1 * | 1/2020 | Shea | G06T 7/62 |
| 2021/0064871 | A1 * | 3/2021 | Sohn | G06F 3/0482 |
| 2022/0270280 | A1 * | 8/2022 | Mercado | G06T 7/62 |
| 2023/0162391 | A1 * | 5/2023 | Lee | G06V 10/82 |
| | | | | 382/100 |
| 2023/0342964 | A1 * | 10/2023 | Tsutsui | G06T 7/579 |

OTHER PUBLICATIONS

Vu et al. "Rotation-invariant palm ROI extraction for contactless recognition." Advances in Computer Vision and Computational Biology: Proceedings from IPCV'20, HIMS'20, BIOCOMP'20, and BIOENG'20. Cham: Springer International Publishing, 2021. 701-715. (Year: 2021).*

Zaman et al. "Real Time Finger Binary Recognition Using Relative Finger-Tip Position." 2013 The International Arab Conference on Information Technology (ACIT '2013). 2013. (Year: 2013).*

Convexity Defects OpenCV; TheAILearner; Nov. 9, 2020; URL: https://theailearner.com/tag/draw-convexity-defects/.

* cited by examiner

SYSTEM AND METHOD FOR ESTIMATING SIZE OF A FINGER OF A USER

CROSS-REFERENCE TO RELATED APPLICATIONS

This application is a continuation and claims priority to U.S. application Ser. No. 18/626,315, filed Apr. 3, 2024, which claims priority to Indian application Ser. No. 20/234, 1078716, filed Nov. 20, 2023, which is hereby incorporated herein by reference in its entirety.

FIELD OF INVENTION

The present invention generally relates to estimating size of a finger of a user. More specifically, the present invention relates to estimating size of the finger of the user through image processing and deep learning techniques.

BACKGROUND

Electronic wearable devices are quite prevalent in today's day and age. Electronic rings especially are increasingly used by consumers. As most people today shop from e-marketplaces, rather than conventional brick and mortar shops, it becomes difficult to correctly estimate size of the electronic ring to be purchased by user. As the user cannot try on a ring virtually, a ring of a size up for the user may become useless, and a ring too tight may be uncomfortable to be worn by the user. Estimating fit of the ring at an e-commerce market place may thus be a hassle as each finger of each user may be uniquely distinct in shape and size.

Thus, there is a need for a user-friendly and cost-effective system for estimating size of a finger of the user.

OBJECTS OF THE INVENTION

A general objective of the present invention is to estimate size of a finger of a user, through image processing and machine learning techniques.

Another objective of the present invention is to estimate size of a ring configurable to be worn by a user, through image processing and machine learning techniques.

Another objective of the present invention is to estimate size of a finger of a user, without making any hardware changes in user device.

SUMMARY OF THE INVENTION

The summary is provided to introduce aspects related to a system for inspection of assembly, and the aspects are further described below in the detailed description. This summary is not intended to identify essential features of the claimed subject matter nor is it intended for use in determining or limiting the scope of the claimed subject matter.

The present invention relates to a system and a method for estimating size of a finger of a user. The method may comprise acquiring one or more images of a hand of the user and a pre-defined reference object by an image capturing device. The pre-defined reference object may have a standard geometric shape. The one or more images may be processed by a processor for recognizing the pre-defined reference object and the hand of the user, for removal of background of the one or more images. By connecting outermost points on contour of the hand, a bounding region may be created by the processor. A plurality of points of convexity defects may be determined on the hand from edges of the bounding region for identifying each finger of the hand. Each point of convexity defect of plurality of points of convexity defects may represent a point between fingers where one finger ends and another finger start. A second bounding box may be assigned to a finger of the hand. The second bounding box may be a rectangle enclosing outermost contour of each finger. Dimension of a width of the second bounding box may be determined based on actual dimensions of the pre-defined reference object obtained from the user. A size of the finger of the user may be estimated based on the width of the second bounding box.

In one aspect, the size of the finger may be widest region of each of the finger of the hand.

In one aspect, the size of the finger may be an outer circumference of each finger based on width of the second bounding box.

In one aspect, the one or more images of hand of the user may be classified as one of a left-hand image or right-hand image.

In one aspect, detecting the objects may include classification of the one or more images may be performed using one or more machine learning models.

In one aspect, the one or more image may be captured from a video sequence when the one or more image is detected to include the pre-defined reference object and the hand of the user within pre-defined vertical and horizontal guidelines.

In one aspect, the size of the finger may be size of a ring configurable to be worn by the user.

In one aspect, a best fit size of the user may be generated based on the size of each finger and pre-defined order of preference of each finger for wearing a ring.

In one aspect, actual dimensions of length and breadth of the pre-defined reference object may be obtained from the user when the pre-defined reference object is rectangular in shape. Virtual dimensions of the pre-defined reference object may be determined. A relation between the virtual dimensions and the actual dimensions may be determined. Actual dimensions of the second bounding box may be determined based on the relationship.

In one aspect, a confidence score may be assigned to a reference object used by the user. The confidence score may be assigned based on detection of textual characters on the pre-defined reference object and properties based on shape of the pre-defined reference object. The reference object may be classified as the pre-defined reference object when the confidence score is greater than a pre-defined threshold value. The size of the finger of the user may be estimated based on dimensions of the pre-defined reference object.

BRIEF DESCRIPTION OF THE DRAWINGS

The accompanying drawings constitute a part of the description and are used to provide further understanding of the present invention. Such accompanying drawings illustrate the embodiments of the present invention which are used to describe the principles of the present invention. The embodiments are illustrated by way of example and not by way of limitation in the figures of the accompanying drawings in which like references indicate similar elements. It should be noted that references to "an" or "one" embodiment in this invention are not necessarily to the same embodiment, and they mean at least one. In the drawings.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this invention is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

Figure 1:
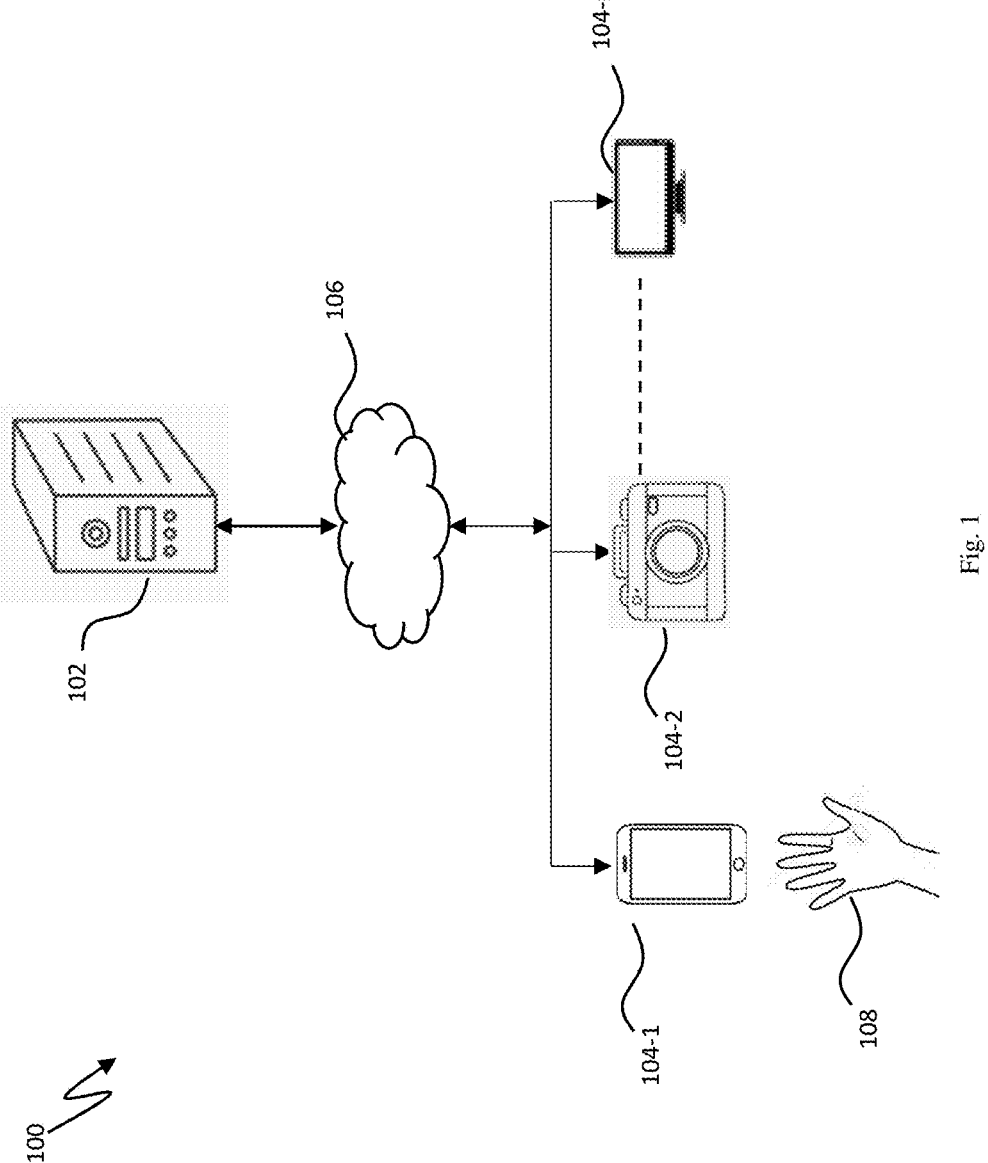
FIG. 1 illustrates a system for estimating size of a finger of the user, in accordance with an embodiment of the present invention.

The present invention relates to a method and a system for determining width of a finger of a user. FIG. 1 illustrates a system 100 for estimating size of a finger of the user, in accordance with an embodiment of the present invention. The system 100 may be implemented over one or more servers 102 hosted locally or present over a cloud network. The server 102 may be coupled to one or more user devices 104-1 to 104-_n_ (generally referred as 104) (alternatively referred to as image capturing device 104) through a communication network 106. The user devices 104 may be an image capturing device and may include a smartphone, a tablet or a computing device such as desktop or laptop including a camera. The user devices 104 may be used to capture one or more images of hands of a user 108. The user devices 104 may also be used to input any other information required from the user. The one or more images and any other information may be transmitted to the server 102 for further processing, for estimating size of the finger of the user 108. Details of the processing in the server 102 is described in greater detail further below.

Figure 2:
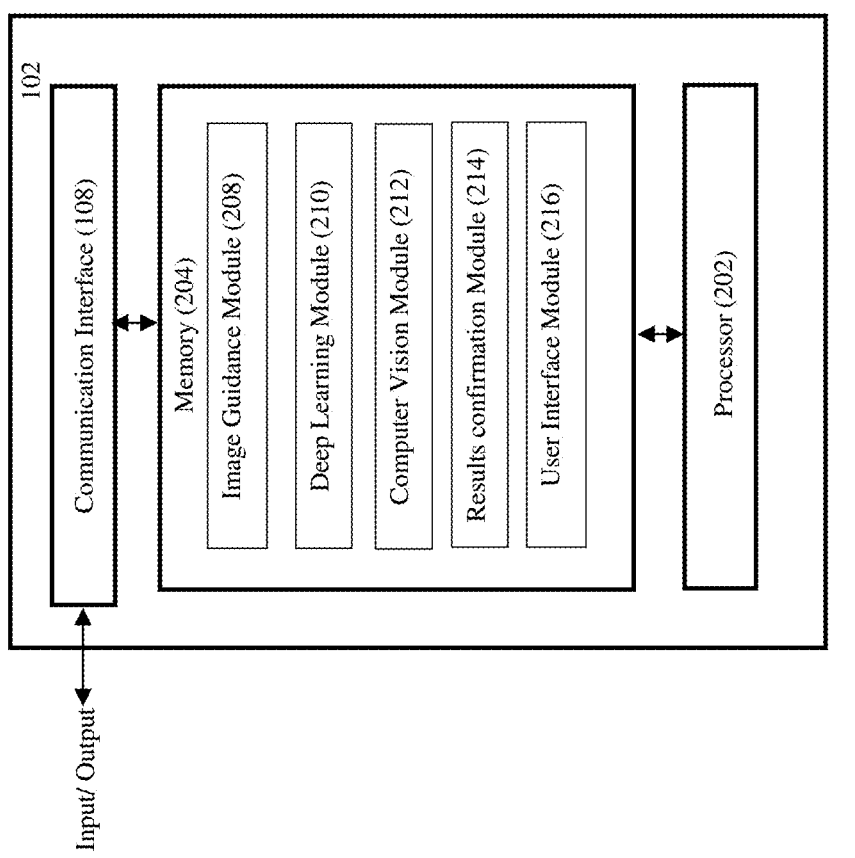
FIG. 2 illustrates a block diagram showing different components present in the server for estimating size of a finger of the user, in accordance with an embodiment of the present invention.

FIG. 2 illustrates a block diagram showing different components present in the server 102 for estimating size of a finger of the user, in accordance with an embodiment of the present invention. The server 102 may comprise one or more processors 202, a memory 204, and a communication interface 206. The processor 202 may be a microcontroller, a microprocessor, a Digital Signal Processor (DSP), an Application Specific Integrated Circuit (ASIC), a Field Programmable Gate Array (FPGA) or other programmable logic device, or any combination thereof. The memory 204 may correspond to any type of non-transitory computer-readable medium. Non-limiting examples of memory 204 that may be utilized in the server 102 may include RAM, ROM, buffer memory, flash memory, solid-state memory, or variants thereof.

The processor 202 may be configured for executing instructions stored in the memory 204. The memory 204 may store program instructions (alternatively referred to as modules) for performing several functions through which the method of detecting size of the finger of the user may be implemented. A few such modules stored in the memory 204 includes image guidance module 208, deep learning module 210, computer vision module 212, results confirmation module 214, and a user interface module 216.

The image guidance module 208 may contain instructions for causing the processor 202 to command the user device 104 to capture one or more images of one or both hands of the user. The user device 104 may also capture an image of a pre-defined reference object. The pre-defined reference object may be a credit card, a visiting card, or any other object of a standard shape and size. The user device 104 may include a camera and/or one or more optical sensors. The optical sensors may include Charge-Coupled Device (CCD) or Complementary Metal-Oxide Semiconductor (CMOS) sensors. In addition to the optical sensor, the user device 104 may comprise one or more sensors configured to enhance quality of the one or more images captured by the user device 104, such as light meters for adjusting exposure, distance meters for detecting distance to an object, contrast sensors for autofocus, lighting device for illuminating the object in different spectrums, motion detectors for triggering capturing of the image, accelerometer and gyroscope sensors for ensuring that the image clicked with minimal tilt of the user device 104, and distortion in the image is minimized.

The user device 104 may be configured for continuous operation, or for on-command operation. In one embodiment, the processor 202 may continuously monitor a continuous video feed from the user device 104, and may instruct the user device 104 to obtain still images whenever the hands or the pre-defined reference object are detected within pre-defined vertical and horizontal guidelines in the continuous video feed. The one or more images may be acquired by the processor 202 and stored in the memory 204.

Images captured by the user device 104 may be provided as inputs to the deep learning module 210. The deep learning module 214 may contain instructions that, when executed by the processor 202, allow the processor 202 to identify a left hand or a right hand of the user in the image. The deep learning module 210 may execute one or more Machine Learning (ML) or an Artificial Intelligence (AI) models for analysing the one or more images and recognizing left hand or right hand of the user based on geometry of the hands. The deep learning module 210 may also execute ML/AI models for detecting objects in the image for recognizing the pre-defined reference object and hands of the user from the one or more images. After recognizing the pre-defined reference object and hands of the user, background of the one or more image or other objects present in the one or more image may be removed, to generate clean images. The clean images may only comprise hands of the user and the pre-defined reference object. The clean images may be stored in the memory 204.

The clean images may be accessed by a computer vision module 216. The computer vision module 212 may cause the processor 202 to analyse the clean images for identifying fingers of the users from the hands, based on contour detection. The contours of the fingers may be determined to segment each finger of the user. The computer vision module 212 may further obtain dimensions of the pre-defined reference object from the user via the communication interface 206. The communication interface 108 may be any known wired or wireless communication protocol. The communication interface 206 may be used for communicating with the user device 104 for receiving and transmitting input and output to the user device 104. The communication interface 206 may be used for acquiring the one or more images, metadata associated with the images, and hand detection information. The one or more images may be storied and/or archived in the memory 104.

Based on the dimensions of the pre-defined reference object, dimensions of each of the fingers of the user may be determined. Width of each finger of the user may be determined and utilised to measure circumference of the finger for determining size of the finger. A best fit size of the user may then be generated, by applying a best fit size algorithm based on pre-defined preference of the fingers. In one implementation, the best fit size may be used to determine size of a ring appropriate for the user.

Before providing the best fit size to the user, the results confirmation module 214 may assign a confidence score to the best fit size. The confidence score may be assigned based on whether the pre-defined reference object used for determining dimensions of the fingers, is correct or not. Checks for determining correctness of the pre-defined object may include inclusion or exclusion of certain text phrases and characters on the pre-defined reference object, and physical properties of the pre-defined object such as shape and aspect ratio. If the confidence score is determined to be above a pre-defined threshold value, the user may directly be presented with the size of the ring that would best fit the user. In case the confidence score is below the pre-defined threshold value, a warning is may be shown to the user to change the pre-defined reference object. The user may determine whether to change the pre-defined reference object to another one and retry the process or whether to override the warning, in case the user thinks that the warning is incorrect.

The best fit size may then be presented to the user via the user interface module 216. The user interface module 216 may comprise instructions for implementing a user interface on the user device 104 for enabling the user of the system 100 to interact with the server 102. The user interface 216 may be implemented as an application or a software. The user interface 216 may include one or more displays to display the captured images. The display(s) may also display a live camera feed on the user device 104. The display(s) may also be configured to display a graphical user interface (GUI) to further enhance the usability of the system 100. The GUI may enable the user to view virtual box or horizontal/vertical gridlines for proper placement of the one or both hands of the user or the pre-defined reference object. The GUI may also guide the user for maintaining an appropriate distance or tilt from the user device 104, for capturing clear images. The GUI may further enable the user to input actual dimensions of the pre-defined reference object in a preferred unit of measurement, and/or use a different pre-defined reference object.

In one implementation, the GUI may also enable the user to input preference of fingers in the left hand and/or the right hand, for example ring finger, index finger, middle finger, small finger or thumb, obtaining the best fit size. In another implementation, the GUI may enable the user to indicate a portion of each finger, for example towards the base of the finger or tip of the finger, for obtaining the best fit size.

Figure 3:
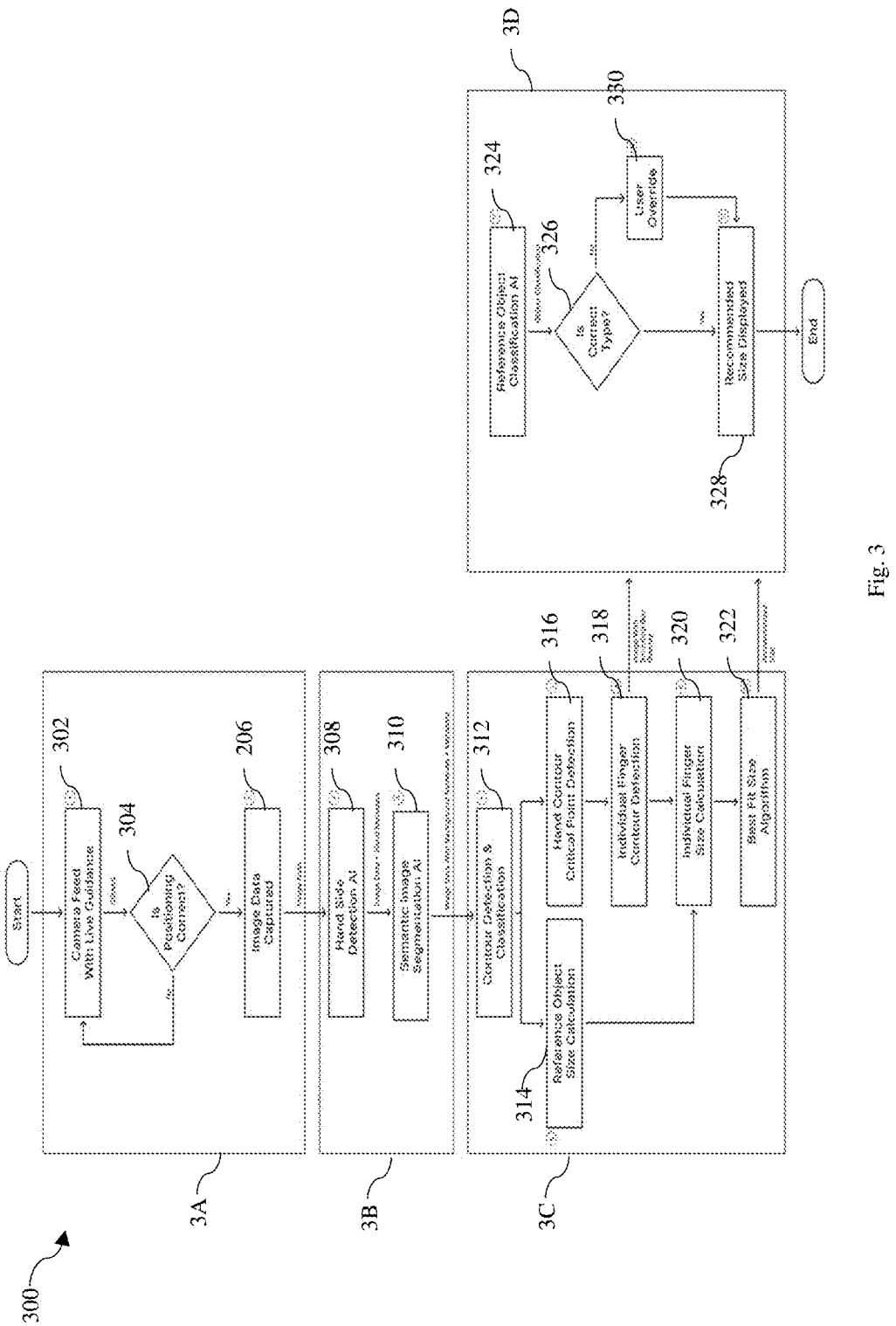
FIG. 3 illustrates a method for determining size of a finger of the user, in accordance with an embodiment of the present invention.

FIG. 3 illustrates a method 300 for determining size of a finger of the user, in accordance with an embodiment of the present invention. It should also be noted that in some alternative implementations, the functions noted in the blocks may occur out of the order noted in the drawings. For example, two blocks shown in succession in FIG. 3 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as decisions made by the program instructions 208 through 216.

As illustrated in block 3A of FIG. 3, at step 302, a live camera video feed may be presented to the user through the image guidance module. The processor may continuously monitor the live camera feed and may guide the user to capture one or more images of hands of the user and a pre-defined reference object using a image guidance module. The live camera video feed may be overlaid with pre-defined virtual boxes or pre-defined horizontal and vertical lines, guiding the user for proper placement of hands and the pre-defined reference object in the frame. At step 304, the processor may determine if the placement of one or more hands of the user in the image is correct. The processor may also determine if the placement of the pre- defined reference object in the image is correct. If the placement of the one or more hands and the pre-defined reference object in the one or more images is correct, the processor may command the image guidance module to capture the one or more images from the live camera feed, at step 306. If the placement of the one or more hands and the pre-defined reference object in the one or more images is incorrect, the method may loop back to step 302 and the user may be prompted to try a different placement.

In block 3B of FIG. 3, at step 308, a first trained ML model may be executed to process the one or more images and predict whether the one or more images contains the user's left- hand or a right-hand. The left-hand or the right-hand of the user may be predicted based on geometry of hands. Output of the first trained ML model may be saved in the memory as metadata of the one or more images. The one or more images and the metadata may further be processed by a second trained ML model for detecting hands and the pre-defined reference object present in the one or more images, at step 310. The second trained ML model may be an Image Semantic Segmentation Model, that semantically predicts object boundaries on a pixel-by-pixel basis. The second trained ML model may recognize and mask out the relevant parts of the one or more images required by the method. The second trained ML model may then clean the one or more images by removing other objects present in background of the one or more images. For example, a surface on which the image is clicked may be removed to obtain clean images. The clean images may thus comprise only the one or more hands of the user and the pre-defined reference object. In one implementation, the first trained ML model and the second trained ML model may be used in concatenation of each other. In another implementation, a single ML model may be executed to implement functionality of the first trained ML model and the second trained ML model.

In block 3C of FIG. 3, at step 312, the processor may detect outermost edges of the one or more hands and the pre-defined reference object to determine contours of each of the one or more hands and the pre-defined reference object. A computer vision contour detection algorithm may be implemented to detect the contours. Based on the contours, the one or more hands of the user and the pre-defined reference object may respectively be classified as a left hand, a right hand, and the pre-defined reference object.

Based on the classification obtained at step 312, virtual dimensions of the pre-defined reference object may be calculated at step 314. The virtual dimensions may be calculated based on actual dimensions of the pre-defined reference object obtained from the user. For example, a length and breadth of a credit card used as the pre-defined reference object may be obtained from the user. The actual dimensions may be obtained in inches or centimetres. A relation between the virtual dimensions and the actual dimensions may be established. For example, in one implementation, an area of the contour of the pre-defined reference object may be compared to actual area of the pre-defined reference object determined based on the actual dimensions. The relationship may create a metric of how many pixels correspond to a unit of measurement of an actual length. The relationship may thus create a measurable sense of scale of objects in the one or more images. Based on the relationship, virtual dimensions of the pre-defined reference object may then be determined in pixels.

At step 316, using the prediction obtained at step 308, an area of the contour the hand, known properties of the geometry of the human hand and classical computer vision techniques such as convex defect detection and convex hull detection, critical points of importance in the contour of the hand may be detected. Based on the critical points, a convex hull boundary may be made around the contour of the hand. The tips of each finger lie on this perimeter.

Figure 4:
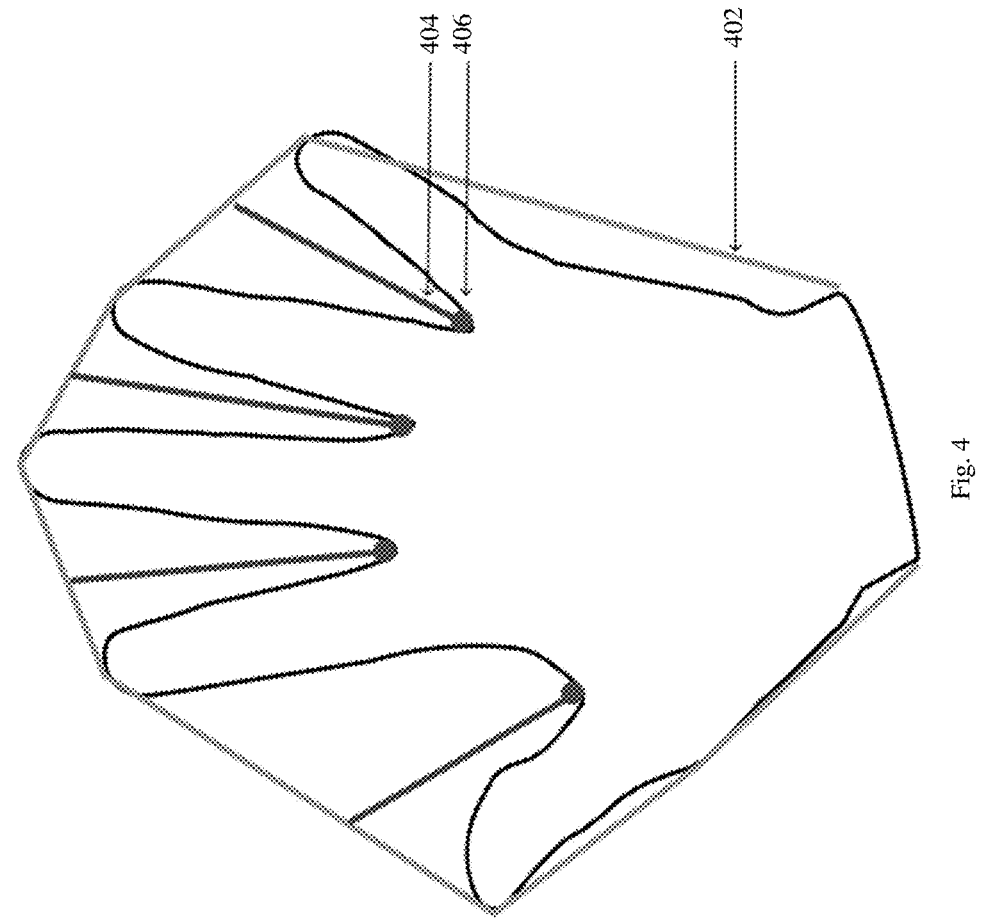
FIG. 4 illustrates an exemplary representation of identification of convexity defects, in accordance with an embodiment of the present invention.

At step 318, contours of each individual finger of the hand of the user may be determined by determining convexity defects on contour of the hand. FIG. 4 illustrates an exemplary representation of identification of convexity defects, in accordance with an embodiment of the present invention. On the convex hull boundary 402 of the hand, any point that may create a convex region 404 with the critical points on the contour of the hand, may be registered as convexity defects. The contour of each finger may be determined by marking convexity defects. The largest six convexity defects on the convex hull boundary 402 may be separated out. The six convexity defects may represent the point between the two fingers i.e. a point of separation 406 on the contour indicating where each finger ends and the subsequent finger starts. Using the point of separation 406, each finger may be identified by the processor.

Referring back to FIG. 3, an individual contour may then be assigned to each finger. The points of separation may be used to separate out a contour representing each finger from the contour of the hand. Thus, resulting in five individual contours, each representing an area of an individual finger of the hand.

At step 320, once individual contour for each finger may be determined. A rotated bounding box may be drawn around the contour of each finger. The rotated bounding box may be a smallest rectangle enclosing all points of the contour. A width of rotated bounding box may represent the widest region of the finger. Thus, the width of the rotated bounding box may be determined. For each individual finger, virtual dimensions of the width of the of the rotated bounding box in pixels may be calculated. Using the relationship derived at step 314, actual dimensions of the width of the finger may be estimated. The processor may now have physical width of each finger.

A size of the finger may be estimated based on actual width of the finger. In one implementation, the size of the finger may be equal to the width of the finger. In another implementation, the size of the finger may be estimated based on width of the finger determined based on an outer circumference of the finger. The size of each the finger may further be used to estimate size of a ring that would fit the finger. The size of the ring may be actual dimensions of diameter of the ring. If the diameter is slightly smaller or just equivalent to this width of the finger, the ring may fit the user perfectly without falling off or being too tight.

At step 322, a best fit size of the user may be determined by the processor. The best fit size of the user may be a best possible size of the ring of the that may most suitably fit the user. The best fit size may account for different shapes and sizes of each finger, and also account for size of the ring available. The best fit size of the user may be determined based on size of each of the finger and a user preference of each finger. The user preference of each finger may be pre-defined and obtained from the user. The user preference of the finger may be based on position of the finger in the hand, and relevance of the finger to wear a ring.

In one scenario, when size of the index finger, the middle finger, and the ring finger are reasonably same within a pre-defined range, the best fit size may be a size that may best possibly fit all the index finger, the middle finger, and the ring finger best together, to aid maximum comfort and user freedom. When the size of the index finger, the middle finger, and the ring finger are slightly different, the best fit size may be a size of the finger having highest user preference. When only one size of the finger may match an available size of the ring, the best fit size may be that size, and when no size of the finger matches an available size of the ring, no best fit size of the finger may be recommended to the user.

In block 3D of FIG. 3, at step 324, before recommending the best fit size to the user, as a precautionary measure against estimating a wrong size of the finger when the user uses an incorrect reference object, the clean image of reference object may be processed using an Object Classification algorithm. The Object Classification algorithm may be implemented using an ML model. The Object Classification algorithm may offer an additional check in cases where a reference object used by the user may be similar enough to a required pre-defined reference object to pass through the ML Model at step 310, but different enough to lead to an incorrect size prediction. For example, the user may use a visiting card instead of a standard sized credit card, an incorrect estimation of size may occur as visiting cards do not have a standard size. The Object Classification algorithm may process the clean image of the reference object used by the user to perform checks using computer vision techniques. The checks may include inclusion or exclusion of certain text phrases and characters printed on the reference object. Physical properties such as shape and aspect ratio of the reference object may also be checked.

After performing object classification, the processor may assign a confidence score indicating whether the reference object used by the user is one of pre-defined reference object. At step 326, the processor may determine if the confidence score is sufficient above a pre-defined threshold value, the user may directly be presented with the best fit size at step 328. When the processor determines that the confidence score is below a pre-defined threshold value, the user may be provided a warning to change the reference object at step 330. The user may override the warning and may proceed to obtain the best fit size at step 328. The user may override the warning at step 330, when the user thinks that the warning is incorrect based on clean images of the reference object presented to the user, at step 310. Alternatively, the user may change the reference object and may repeat the method.

The system and the method for determining size of a finger of the user offers an end-to-end estimation method for determining size of a ring for the user by using a single image including a reference object. The system and the method may intelligently detect if the user might not be using the correct reference object and prompt them to change the same. The method may be implemented on any smartphone without requiring any device specific calibration. The method further automatically corrects for deviations in measurement of the size of the finger due to deviated angles in placement of fingers and other imperfections. The method offers a simplistic and user-friendly technique to determine a size of a ring of the user. The method may be extended for determining size of electronic rings and jewellery rings, configured to be worn on any portion of the finger of the user.

A number of implementations of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

We claim:

1. A method for estimating size of a finger of a user, comprising:

acquiring one or more images of a hand of the user and a pre-defined reference object having a standard geometric shape;

detecting objects in the one or more images for recognizing the pre-defined reference object and the hand of the user, for removal of background of the one or more images;

creating a bounding region by connecting outermost points of a contour of the hand;

determining a plurality of points of convexity defects on the hand from edges of the bounding region for identifying each finger of the hand, wherein each point of convexity defect of plurality of points of convexity defects represent a point between fingers where one finger ends and another finger start, assigning a second bounding box to a finger of the hand, the second bounding box being a rectangle enclosing outermost contour of the finger;

determining dimension of a width of the second bounding box based on actual dimensions of the pre-defined reference object obtained from the user, wherein a size of the finger of the user is estimated based on the width of the second bounding box, and wherein the method further comprises:

capturing one or more images from a video sequence when the one or more image is detected to include the pre-defined reference object and the hand of the user within pre-defined vertical and horizontal guidelines; and generating a best fit size of the user based on a size of each finger and pre-defined order of preference of each finger for wearing a ring.

2. The method as claimed in claim 1, wherein the size of the finger is widest region of the finger of the hand.

3. The method as claimed in claim 1, wherein the size of the finger is an outer circumference of the finger based on width of the second bounding box.

4. The method as claimed in claim 1, wherein detecting the objects includes classification of the one or more images as one of left-hand image or right-hand image.

5. The method as claimed in claim 1, wherein detecting the objects is performed using one or more machine learning models.

6. The method as claimed in claim 1, further comprising:

obtaining, from the user, actual dimensions of length and breadth of the pre-defined reference object, when the pre-defined reference object is rectangular in shape;

determining virtual dimensions of the pre-defined reference object;

establishing a relation between the virtual dimensions and the actual dimensions, and determining actual dimensions of the second bounding box based on the relationship.

7. The method as claimed in claim 1, further comprising:

assigning a confidence score to a reference object used by the user, wherein the confidence score is assigned based on detection of textual characters on the pre-defined reference object and properties based on shape of the pre-defined reference object;

classifying the reference object as the pre-defined reference object when the confidence score is greater than a pre-defined threshold value; and estimating the size of the finger of the user based on dimensions of the pre-defined reference object.

8. A system for estimating size of a finger of a user, comprising:

an image capturing device configured to acquire one or more images of a hand of the user and a pre-defined reference object having a standard geometric shape;

a processor configured to process the one or more images to:

detect objects in the one or more images for recognizing the pre-defined reference object and the hand of the user, for removal of background of the one or more images;

create a bounding region by connecting outermost points of a contour of the hand;

determine a plurality of points of convexity defects on the hand from edges of the bounding region for identifying each finger of the hand, wherein each point of convexity defect of plurality of points of convexity defects represent a point between fingers where one finger ends and another finger start, assign a second bounding box to a finger of the hand, the second bounding box being a rectangle enclosing outermost contour of the finger;

determine dimension of a width of the second bounding box based on actual dimensions of the pre-defined reference object obtained from the user, estimate a size of the finger of the user is estimated based on the width of the second bounding box;

wherein the image capturing device captures the one or more image from a video sequence when the one or more image is detected to include the pre-defined reference object and the hand of the user within pre-defined vertical and horizontal guidelines; and wherein the processor generates a best fit size of the user based on a size of each finger and pre-defined order of preference of each finger for wearing a ring.

9. The system as claimed in claim 8, wherein the size of the finger is widest region of each of the finger of the hand.

10. The system as claimed in claim 8, wherein the size of the finger is an outer circumference of the finger based on width of the second bounding box.

11. The system as claimed in claim 8, wherein the processor classifies the one or more images of hand as one of a left-hand image or right-hand image.

12. The system as claimed in claim 8, wherein the processor executes one or more machine learning models for detecting objects in the one or more images.

13. The system as claimed in claim 8, the processor:

obtains, from the user, actual dimensions of length and breadth of the pre-defined reference object, when the pre-defined reference object is rectangular in shape;

determines virtual dimensions of the pre-defined reference object;

establishes a relation between the virtual dimensions and the actual dimensions, and determines actual dimensions of the second bounding box based on the relationship.

14. The system as claimed in claim 8, the processor:

assigns a confidence score to a reference object used by the user, wherein the confidence score is assigned based on detection of textual characters on the pre-defined reference object and properties based on shape of the pre-defined reference object;

classifies the reference object as the pre-defined reference object when the confidence score is greater than a pre-defined threshold value; and estimates the size of the finger of the user based on dimensions of the pre-defined reference object.

15. A system for estimating size of a finger of a user, comprising:

an image capturing device configured to acquire images containing a hand of the user and a pre-defined reference object of a standard geometric shape;

a processor configured to:

detect the pre-defined reference object and the hand of the user from the images and remove the background;

identify a contour of the hand and create a bounding region by connecting outermost points of the contour;

determine points of convexity defects on the hand for segmenting individual fingers based on the bounding region;

assign a bounding box to each segmented finger, wherein the bounding box represents the outermost contour of the finger;

calculate the actual dimensions of the bounding box using a scale derived from the pre-defined reference object; and estimate the size of the finger based on the calculated dimensions of the bounding box;

wherein the image capturing device captures the one or more image from a video sequence when the one or more image is detected to include the pre-defined reference object and the hand of the user within pre-defined vertical and horizontal guidelines; and wherein the processor generates a best fit size of the user based on a size of each finger and pre-defined order of preference of each finger for wearing a ring.

* * * * *